(12) United States Patent
Carrouset et al.

(10) Patent No.: US 9,908,294 B2
(45) Date of Patent: Mar. 6, 2018

(54) MACHINE FOR PRODUCING CIRCULAR PRODUCTS BY MEANS OF LAYER-BY-LAYER ADDITION

(71) Applicant: CARPYZ SAS, Issy les Moulineaux (FR)

(72) Inventors: Pierre Carrouset, Paris (FR); Nicole Carrouset, Paris (FR); Gabrielle Carrouset, Paris (FR)

(73) Assignee: CARPYZ SAS, Issy les Moulineaux (FR)

(*) Notice: Subject to any disclaimer, the term of this patent is extended or adjusted under 35 U.S.C. 154(b) by 356 days.

(21) Appl. No.: 14/398,276

(22) PCT Filed: Jul. 31, 2013

(86) PCT No.: PCT/EP2013/066083
§ 371 (c)(1),
(2) Date: Oct. 31, 2014

(87) PCT Pub. No.: WO2014/032895
PCT Pub. Date: Mar. 6, 2014

(65) Prior Publication Data
US 2015/0158251 A1     Jun. 11, 2015

(30) Foreign Application Priority Data
Aug. 29, 2012 (FR) .................................. 12 02318

(51) Int. Cl.
*G06F 7/66* (2006.01)
*B29C 67/00* (2017.01)
(Continued)

(52) U.S. Cl.
CPC ........ *B29C 67/0088* (2013.01); *B22F 3/1055* (2013.01); *B29C 64/153* (2017.08);
(Continued)

(58) Field of Classification Search
CPC ..................................................... B29C 67/0088
(Continued)

(56) References Cited

U.S. PATENT DOCUMENTS 4,125,581 A * 11/1978 Rasmussen ......... B29C 47/0004
156/244.19
5,496,683 A * 3/1996 Asano ................. B29C 67/0066
156/58
(Continued)

OTHER PUBLICATIONS

Yan, Xue, and P. E. N. G. Gu. "A review of rapid prototyping technologies and systems." Computer-Aided Design 28.4 (1996): pp. 307-318.*
(Continued)

*Primary Examiner* — Satish Rampuria
(74) *Attorney, Agent, or Firm* — Dennemeyer & Associates, LLC

(57) ABSTRACT

The invention relates to a machine for the layer-by-layer production of objects, comprising: a circular rotary container arranged in the lower part (B), the inside thereof being provided with independently and vertically motor-driven cylindrical crowns (7); and a stationary part that tops the container. The machine also includes at least one production unit comprising a first station (1) for distributing the layer of product, a second station (2) for evening out the thickness of the layer, a third station (3) for controlling and regulating the temperature of the next layer, a fourth station (4) for solidifying the useful surfaces of the layer of product, a fifth station (5) for controlling and regulating the temperature of the layer that has just been deposited, and a sixth station (6) for treating and impregnating the layer.

5 Claims, 2 Drawing Sheets

(51) Int. Cl.
- *B22F 3/105* (2006.01)
- *G05B 15/02* (2006.01)
- *B29C 64/153* (2017.01)
- *B29C 64/165* (2017.01)
- *B29C 64/20* (2017.01)
- *B29C 64/386* (2017.01)
- *B33Y 50/02* (2015.01)

(52) U.S. Cl.
CPC .......... *B29C 64/165* (2017.08); *B29C 64/20* (2017.08); *B29C 64/386* (2017.08); *G05B 15/02* (2013.01); *B22F 2003/1056* (2013.01); *B33Y 50/02* (2014.12); *Y02P 10/295* (2015.11)

(58) Field of Classification Search
USPC .................................................. 700/117–129

See application file for complete search history.

(56) References Cited

U.S. PATENT DOCUMENTS

| 6,574,520 B1* | 6/2003 | Liu .................. A61F 13/15804 29/563 |
| 2002/0026982 A1* | 3/2002 | Bredt ...................... B28B 1/00 156/284 |
| 2006/0228248 A1* | 10/2006 | Larsson .............. B29C 67/0077 419/6 |

OTHER PUBLICATIONS

Lee, C. S., et al. "Measurement of anisotropic compressive strength of rapid prototyping parts." Journal of materials processing technology 187 (2007): pp. 627-630.*

Hutmacher, Dietmar W., Michael Sittinger, and Makarand V. Risbud. "Scaffold-based tissue engineering: rationale for computer-aided design and solid free-form fabrication systems." TRENDS in Biotechnology 22.7 (2004): pp. 354-362.*

* cited by examiner

MACHINE FOR PRODUCING CIRCULAR PRODUCTS BY MEANS OF LAYER-BY-LAYER ADDITION

BACKGROUND OF THE INVENTION

The difficulty encountered on current layer-by-layer powder sintering machines is their low capacities due to the alternating linear sweeping of the work area, which is a handicap because the back-and-forth movements take considerable time, which is detrimental for circular parts with a large diameter, and also because the cooling of the parts produced in the containers is very time-consuming.

The temperature of the deposited layers is practically not controlled or regulated continuously, which requires a certain time for cooling before it is possible to apply new layers, as well as afterwards to remove the finished parts from the container holding them.

The principle of construction by stacking layer by layer is natural and has been used since the beginning of time to construct buildings, even before the Egyptian pyramids.

It is now allowed to build products with very complex helical shapes with increasingly thin layers, which were never before possible to manufacture with the tools of the time, owing to cumulative technical progress made simultaneously in all fields:
- the precision of mechanical construction,
- resin polymerization, laser powder sintering, cutting thin sheets, and adding material,
- the performance of the computer hardware added to that of software packages,
- the possibilities for sending files over the Internet,
- the machines that manufacture successive layers by using the received files directly,
- as well as owing to the CARPYZ computer tool, which allows the rapid online creation of new products with very complex helical shapes and makes it possible to have them generated and manufactured by sending files anywhere in the world, bringing them from virtual to concrete almost instantaneously.

Many Patents show the interest paid to machines for layer-based manufacturing: FR 2166526 (1973), U.S. Pat. No. 5,637,175 (1997), EP 1,358,994 (2003), WO2004/108398 (2004), etc.

SUMMARY OF THE INVENTION

The principle of a rotating circular plate making it possible to successively distribute the work to stations placed around the plate is also very old (so-called transfer machines).

This new design and construction possibility for machines that build layer by layer is remarkable in that they have a circular container situated in the lower part (B) that rotates continuously or stepwise on a fixed base (D) and the inside of which is provided with independently vertically motorized cylindrical crowns (7) that receive the successive layers, and in the upper part of the machine a stationary part that caps the container and comprises, contained in an angular portion of the surface of the circle of the lower container (FIG. 1), at least one manufacturing unit which in turn is divided into several successive sections and along cross-section A-A', the first (1) distributes the layer of product from a store, the second (2) evens out the thickness of the layer of product or compresses it and sends the excess distributed product to the store, the third (3) makes it possible to control and regulate the temperature of the next layer with a stationary plate, which is preferably microporous, the fourth (4) is that where the useful surfaces of the layer of product to be kept are swept either by the laser to melt them or by spraying an additive to agglomerate them or other means to modify the consistency of the product, the fifth (5) makes it possible to control and regulate the temperature of the layer just deposited, preferably using a hollow cylinder with a controlled and regulated temperature whereof the periphery rotates with the layer, a sixth (6) makes it possible to treat and impregnate the layer before presentation to the following manufacturing unit by adding a complementary product by spraying or by the presence of a gas.

It is also remarkable that the independent circular crowns (7) individually and vertically sink in and divide the surface of the container into circular sectors that are treated independently by the six stations of the upper part of the machine, which in turn are adapted to treat each of the crowns individually.

When necessary, the successive positions of the stations (1-6) are moved relative to one another.

The lower container (B) rotates in a programmed manner on a stationary base (D) and they are temporarily secured to each other for handling, and the lower container is provided with lifting (9) and tilting (8) rings to that end.

On the floor, motorized devices make it possible to fasten the base on a specific and stable point during manufacturing.

It should be noted that during manufacturing periods, the machine is kept in a sealed, atmosphere- and temperature-controlled enclosure and the lower container is provided with a device that makes it possible to maintain a slight overpressure using a compatible filtered gas taken from the controlled atmosphere of the enclosure.

The diagrammatic drawings and the indicated elements are provided non-limitingly.

DETAILED DESCRIPTION OF THE INVENTION

Figure 1:
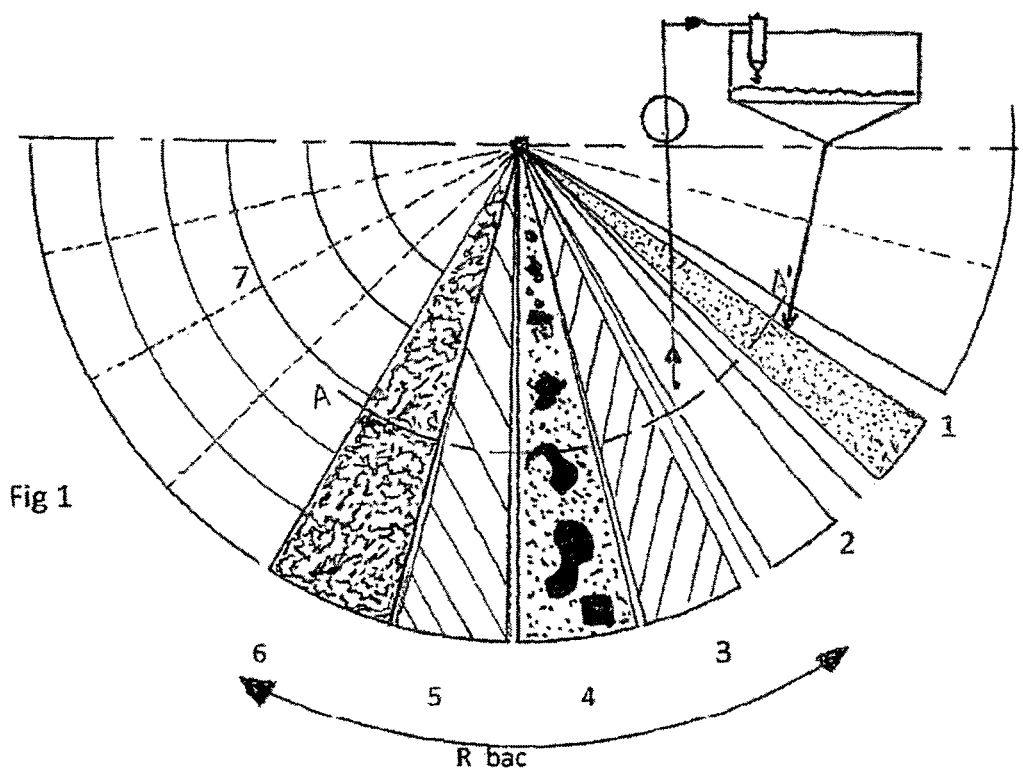
FIG. 1 is a schematic representation of a manufacturing unit made in accordance with the present invention.

The drawing (FIG. 1) shows, on an angular sector, an independent manufacturing unit which in turn is divided into several sectors (1 to 6). The remainder of the 180° of the half-circle of the drawing shows a top view of the circular crowns in the lower container (7).

It shows that the $1^{st}$ zone distributes each layer of product on the complete circle portion (1) or on the active circular crowns chosen from the lower container (7); the $2^{nd}$ evens out the thickness of the layer of product, or compresses it, and recovers the excess product (2); the $3^{rd}$ makes it possible to control and regulate the upstream temperature (3); the $4^{th}$ is when the lasers write on the product by melting it or other methods are used that add material, or modify the consistency of the product (4); the $5^{th}$ makes it possible to control and regulate the downstream temperature (5); and the $6^{th}$ is used to add an additional product by spraying or impregnation or by the presence of a gas or mist (6).

The circular arrow shows the direction of rotation of the lower container, which is reversible (R container).

Figure 2:
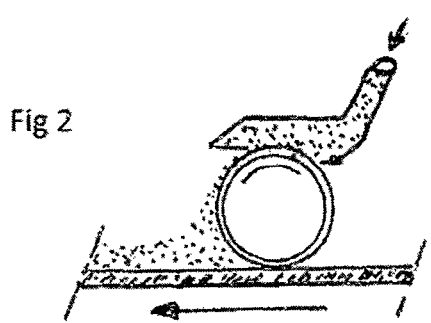
FIG. 2 is a cross-section, made along line A-A' of FIG. 1.
Figure 3:
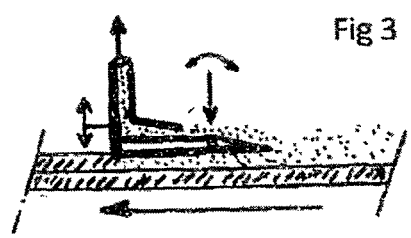
FIG. 3 is an elevational view of a device for evening out the layer of product.
Figure 4:
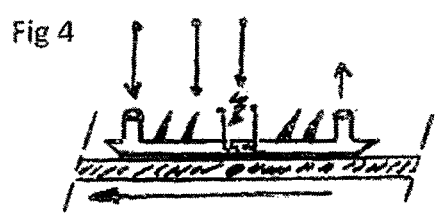
FIG. 4 is an elevational view of a device for temperature regulation.
Figure 5:
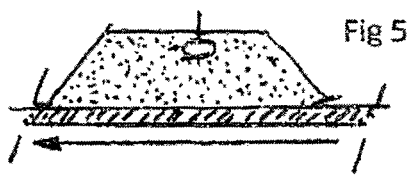
FIG. 5 is an elevational view of a spraying device.

Along cross-section A-A', drawing (FIG. 2) shows, as a non-limiting example, the product distributing device, drawing (FIG. 3) shows a device evening out the layer of product, drawing (FIG. 4) shows a device that makes it possible to regulate the temperature, and drawing (FIG. 5) shows a spraying device for impregnation of the product.

Figure 6:
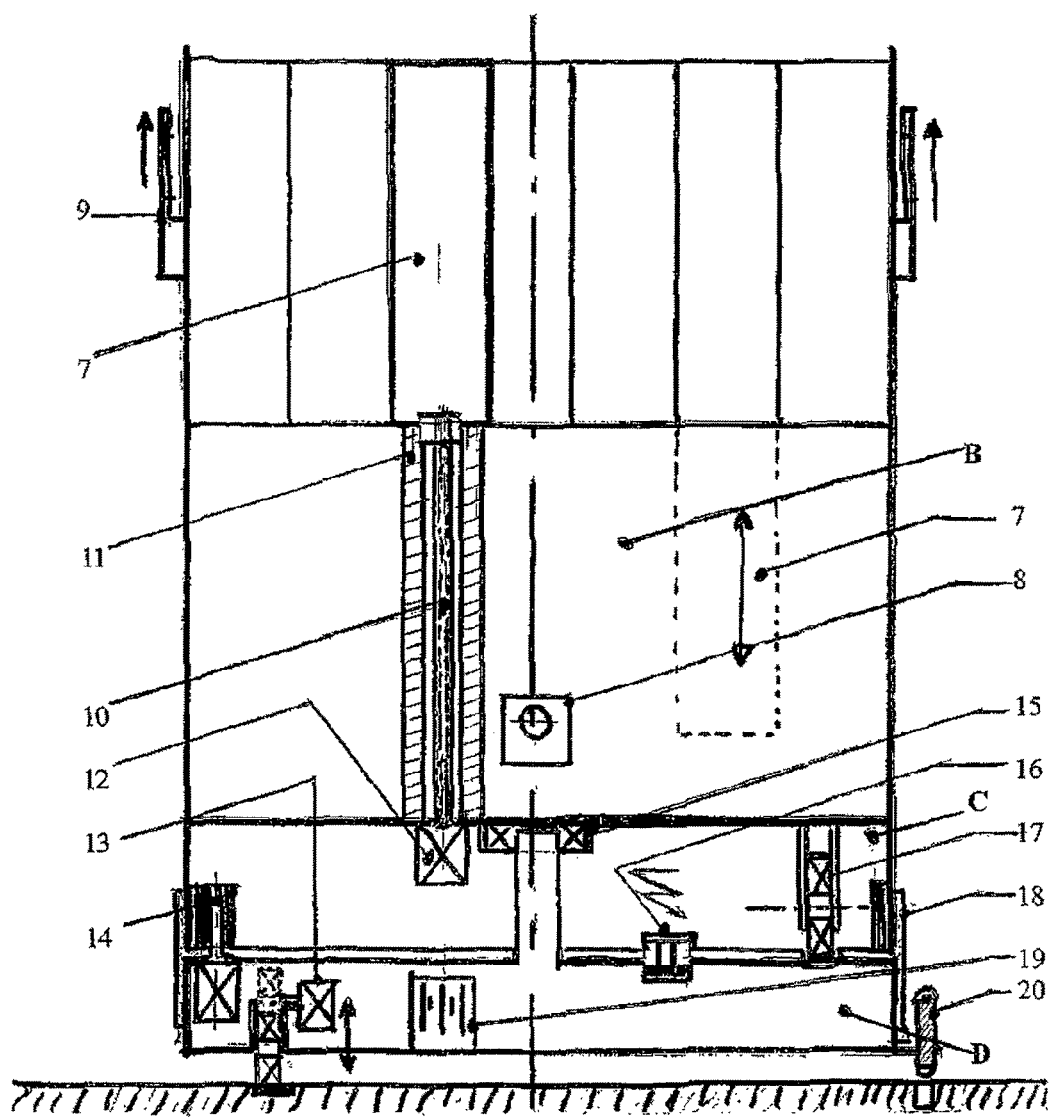
FIG. 6 is a diagrammatical view of a lower container.

Drawing (FIG. 6) diagrammatically and non-exhaustively shows manufacturing details of the lower container (B) of its lower chamber, a circular container (C) and the base (D), which are traditional elements used in the construction of machines that do not claim any novelty in themselves but are part of a whole:

(8) tilting ring, (9) lifting rings, (10) lifting screw of the crowns, (11) protective bellows for the screws, (12) motor of the screws, (13) devices for motorized lifting and movement of the base, (14) rack gear motor for rotating the container, (15) central bearing for centering the container on the base, (16) electricity transfer rings, (17) bearings for rotating the container on the base, (18) dust-protection skirts, (19) batteries for autonomy of the movement of the base, (20) device for blocking the base precisely in position in the working position.

The invention claimed is:

1. A method for designing and building machines that manufacture layer by layer, characterized in that a machine has a circular container situated in the lower part (B) that rotates continuously or stepwise on a fixed base (D) and the inside of which is provided with independently vertically motorized cylindrical crowns (7) that receive the successive layers, and in the upper part of the machine a stationary part that caps the container and comprises, contained in an angular portion of the surface of the circle of the lower container, characterized in that the independent circular crowns (7) individually and vertically sink in and divide the surface of the container into circular sectors that are treated independently by the several successive sections of the upper part of the machine, which in turn are adapted to treat each of the crowns (7) individually, at least one manufacturing unit which in turn is divided into several successive sections performing the following steps:

(1) distributing the layer of product from a store,
(2) evening out the thickness of the layer of product or compressing the layer and sending the excess distributed product to the store,
(3) controlling and regulate the temperature of the next layer with a stationary plate, which is preferably microporous,
(4) sweeping together the useful surfaces of the layer of product either by using the laser to melt them or by spraying an additive to agglomerate them or to modify the consistency of the product,
(5) controlling and regulating the temperature of the layer just deposited, preferably using a hollow cylinder with a controlled and regulated temperature whereof the periphery rotates with the layer,
(6) treating and impregnating the layer before presentation to the following manufacturing unit by adding a complementary product by spraying or by the presence of a gas.

2. The method for designing and building machines that manufacture layer by layer according to claim 1, characterized in that the successive positions of the several successive sections are moved relative to one another.

3. The method for designing and building machines that manufacture layer by layer according to claim 1, characterized in that the lower container (B) rotates in a programmed manner on a stationary base (D) and they are temporarily secured to each other for handling, and the lower container is provided with lifting (9) and tilting (8) rings to that end.

4. The method for designing and building machines that manufacture layer by layer according to claim 1, characterized in that on the floor, motorized devices make it possible to fasten the base on a specific and stable point during manufacturing.

5. The method for designing and building machines that manufacture layer by layer according to claim 1, characterized in that during manufacturing periods, the entire machine is kept in a sealed, atmosphere- and temperature-controlled enclosure and the lower container is provided with a device that makes it possible to maintain a slight overpressure using a compatible filtered gas taken from the controlled atmosphere of the enclosure.

* * * * *